(12) United States Patent
Greenberg et al.

(10) Patent No.: US 6,320,696 B1
(45) Date of Patent: *Nov. 20, 2001

(54) MICROSCOPE ILLUMINATION AND STEREO VIEWING INCLUDING CAMERA PORTS

(76) Inventors: Gary Greenberg, 4231 Kenyon Ave., Los Angeles, CA (US) 90066; Robert Ginsberg, 4265 Marina City Dr., Suite 1011W, Marina del Rey, CA (US) 90292

(*) Notice: Subject to any disclaimer, the term of this patent is extended or adjusted under 35 U.S.C. 154(b) by 1374 days.

(21) Appl. No.: 08/630,542

(22) Filed: Apr. 10, 1996

Related U.S. Application Data (60) Division of application No. 08/163,924, filed on Dec. 8, 1993, now Pat. No. 5,539,572, which is a continuation-in-part of application No. 08/143,484, filed on Oct. 26, 1993, now abandoned, which is a continuation-in-part of application No. 07/957,286, filed on Oct. 6, 1992, now abandoned.

(51) Int. Cl.[7] .............................. G02B 21/22; G02B 21/36
(52) U.S. Cl. ........................ 359/377; 359/389; 359/363
(58) Field of Search .................................. 359/377, 376, 359/375, 389, 363

(56) References Cited

U.S. PATENT DOCUMENTS

| | | | | |
|---|---|---|---|---|
| 1,470,670 | * | 10/1923 | Heimstadt ............................ | 359/377 |
| 2,753,760 | * | 7/1956 | Braymer .............................. | 359/363 |
| 3,820,882 | * | 6/1974 | Jakubowski .......................... | 359/363 |
| 4,448,498 | * | 5/1984 | Muller et al. ........................ | 359/377 |
| 4,688,907 | * | 8/1987 | Kleinberg ............................ | 359/377 |
| 4,763,968 | * | 8/1988 | Minami et al. ...................... | 359/377 |

* cited by examiner

*Primary Examiner*—Jon Henry
(74) *Attorney, Agent, or Firm*—H. Michael Brucker (57) ABSTRACT

A light microscope with lenses projecting the rear aperture of an objective lens at a location remote from the objective lens enhancing high power stereoscopic viewing and photographing with a binocular (two eyepiece) viewing system and when combined with an iris in close proximity to the projected image of the rear aperture of the objective lens, controls flare.

15 Claims, 8 Drawing Sheets

MICROSCOPE ILLUMINATION AND STEREO VIEWING INCLUDING CAMERA PORTS

This is a divisional of application Ser. No. 08/163,924 filed on Dec. 8, 1993, which is in turn now U.S. Pat. No. 5,539,572 which designated the U.S. a continuation-in-part of our application Ser. No. 08/143,484, Filed Oct. 26, 1993, now abandoned for IMPROVEMENTS IN STEREOSCOPIC MICROSCOPES, now abandoned which is a continuation-in part of application Ser. No. 07/957,286 for IMPROVEMENTS IN STEREOSCOPIC MICROSCOPES filed Oct. 6, 1992, now abandoned.

BACKGROUND OF THE INVENTION

1. Field of the Invention

The present invention relates to light microscopes including light microscopes having dual eyepiece (binocular) viewing and the ability to produce a stereoscopic (stereo) image that can be viewed and/or photographed in real time. The invention further relates to reflected light illumination (including epi illuminated fluorescent images) for microscopes with reduced flare without reduced specimen illumination.

2. The Prior Art

Although many microscopes are equipped with a binocular viewing arrangement, that alone does not produce a stereoscopic view of an object since both of the viewing eyepieces typically see the exact same image from the same angle. Stereoscopic viewing requires that each eye see a different image of the object. This is accomplished by creating parallax (viewing the object from different angles) in much the same way that human eye pairs create stereoscopic vision.

At the present time there are two types of stereoscopic microscopes widely known and used. The first of these (inclined axes type) is, in essence, two complete microscopes with their objectives close together and with their major axes inclined to each other to permit object viewing from two different angles to create the parallax necessary for producing a stereo pair. An example of this type of microscope is the Nikon® model SMZ-2B/2T.

The other type of stereo microscope (parallel-axis type) utilizes a single large objective lens followed by two smaller side-by-side lens groups whose axes are parallel to the objective lens axis and which share the aperture of the large objective. In this arrangement, only a small portion of the aperture of the large objective lens is used. An example of this type of microscope is the Nikon® model SMZ-10.

Both of these types of stereo microscopes have the well recognized limitation in the magnification that can be achieved. This limitation, that prevents total magnification of more than 100 times (approximately), is imposed by the practicalities of size and space. As magnification increases, the size of the objective (and its focal length and working distance) decreases. In the case of the inclined type of microscope, there is insufficient space for two objective lenses when the objective magnification exceeds approximately 10 times (the centers of the lenses need to be closer together than their physical size—radii—permits). Likewise, for the parallel-axis microscope, it is not possible to physically dispose two side-by-side secondary lenses behind the primary objective when the objective is diminished beyond a certain size (i.e. as the objective magnification increases beyond 10 times—approximately).

One undesirable characteristic of reflection illumination, and especially fluorescent illumination (either by virtue of natural fluorescence or the use of fluorescent markers), is flare, which if not controlled, can prevent good images from being captured. Prior art systems using epi fluorescent illumination, for example, have attempted to control flare by the use of an iris within the rear aperture of the objective. Since all such irises are optically disposed between the light source and the objective, they necessarily reduce the light that reaches the specimen as they reduce flare. Thus, the cost of controlling the flare is a reduction in the amount of light that reaches the specimen (object) and a concomitant reduction in the numerical aperture of illumination. While the control of flare in this way eliminates one source of image degradation, the accompanying light loss can prevent images from being recorded on film in some specimens and seriously reduces the quality of images that are achieved in others.

SUMMARY OF THE INVENTION

The present invention provides improvements in microscopes including reduced flare without reduced illumination and an improved binocular viewing head and camera recording system in which each eyepiece and/or camera views the object from a different angle through a single objective, regardless of the size of the objective, and therefore, regardless of the overall magnification of the microscope. The invention permits the simultaneous viewing and photographing of stereo images and convenient means for photographing images in two dimensions for the highest possible resolution.

The objects of the invention are achieved by projecting an image of the rear aperture of the microscope objective lens at a remote location in space (relative to the actual rear aperture) and dividing the beam at the projected image and/or placing an iris at the projected image to control flare.

For stereo viewing or recording, reflector means operate very near the rear aperture of the objective lens to divide the light into two separate beams and direct those beams to the two separate viewing means (eyepieces and/or cameras) of the binocular viewing system. A reflector means in the form of a "V" shaped mirror reflects the light from one half of the objective (via other reflector means) to one of the viewing means while the other half of the light is reflected to the other viewing means. In this way each viewing means receives the light from one half of the objective rear aperture and therefore views the object from a different angle, producing true stereoscopic viewing in real-time, with real color, using either transmitted light, reflected light or fluorescence light.

Because limitations of size and space for high power microscopes make it impossible or impractical to place a mirror at the rear aperture of the objective lens where the beam is most advantageously divided, lenses are used to relay an image of the rear aperture of the objective at a location in space where the mirror can be practically located. The beam is then divided at this location in space precisely as it would be if the mirror were physically located adjacent the objective's rear aperture. The particular lenses used to produce the remote imaging of the objective rear aperture depend on whether the objective is of the "infinity focus" type or the "finite focus" type, as well as on all the other parameters of the particular optical system. In either case the result is the same.

The unique combination of the projected image of the rear aperture of the objective and the placement of an iris near that projected image (in that proximity to the projected image of the rear aperture of the objective lens in which the image of the iris is not seen by the viewing means), provides for the first time the ability to control flare in a microscope using reflected light without having to reduce the intensity and cone angle of the illumination reaching the specimen. Using this unique combination, it is possible to see and record epi illuminated images (including specimens that fluoresce) of a quality never before known. When combined with the stereo teachings of the invention, it also provides for the first time the ability to take high power simultaneous stereo pair photographs of reflected light images, including epi illuminated fluorescent images.

Thus, it is an object of the present invention to provide an improved stereoscopic viewing system for a light microscope for producing, viewing and/or recording stereo images of an object.

A further object of the invention is to provide an improved head for a light microscope for stereo viewing in which the spacial orientation of the viewed image is the same as that of the object being viewed.

Yet another object of the present invention is to provide a high power microscope stereoscopic viewing head which can readily produce 3D stereo pair photographs simultaneously, as well as high resolution two dimensional photographs.

Another object of the present invention is to provide reflection illumination (including epi fluorescent illumination) with reduced flare without reducing the amount of light directed onto the specimen (object).

There are other objects of the invention which in part are obvious and in part will become apparent from the description of the invention set forth herein below.

DETAILED DESCRIPTION OF THE INVENTION

Figure 1:
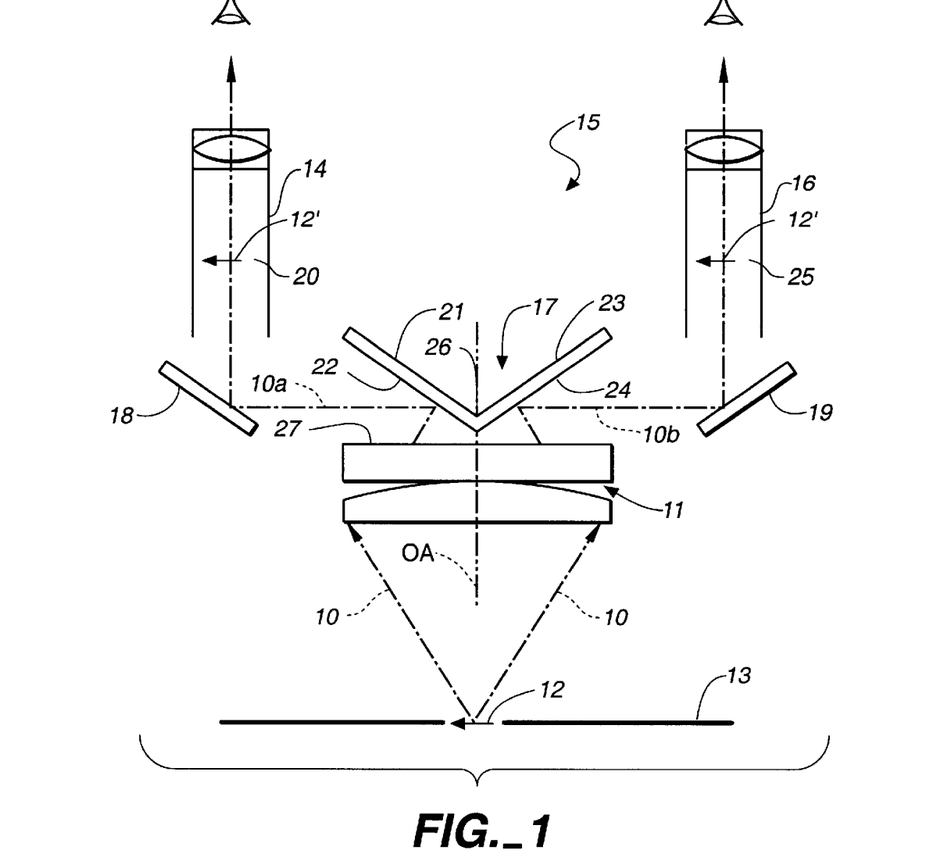
FIG. 1 is schematic illustration of a binocular optical system for stereoscopic viewing incorporating one embodiment of the present invention.

Referring to FIG. 1, a microscope objective 11 (typically composed of a plurality of lens elements) receives a light beam 10 from an illuminated object 12 located at a specimen plane 13. A V-shaped mirror beam dividing means (divider) 17 divides the beam 10 into two separate beams, 10a and 10b. The separate beam 10a follows a path to a left eyepiece mirror 18 and left eyepiece 14 of binocular viewing system 15. The other separate beam 10b follows a path to a right eyepiece mirror 19 and a right eyepiece 16 of binocular viewing system 15. An image 12' of the object 12 is created at the focal plane 20 of eyepiece 14 and focal plane 25 of eyepiece 16.

The V-shaped mirror 17 is formed by a left panel 21 having a reflective surface 22 and a right panel 23 having a reflective surface 24 joined together at a right angle along a mirror edge line 26. The mirror 17 can take anyone of several forms including that resulting from silvering the two faces of a prism (see FIG. 4). The essential elements of the mirror 17 for the purposes of the present invention are two reflecting surfaces at approximately right angles positioned at approximately 45 degrees to the optical axis OA of objective lens 11. By placing the mirror 17 in close proximity to, and with its edge line 26 generally bisecting the rear aperture 27 of objective 11 (edge 26 falling along a diameter of the rear aperture), half of the light passing through the rear aperture 27 of objective lens 11 will be reflected to the left eyepiece 14 by way of left eyepiece mirror 18 and the other to right eyepiece 16 by way of right eyepiece mirror 19.

By virtue of this arrangement of components, the left eyepiece views the object 12 from the angle of the left half of the objective lens 11 while the right eyepiece views the object from the angle of the right half of the objective lens, thereby giving rise to a stereoscopic view of the object through the binocular viewing system 15.

In order for the mirror 17 to capture a full field of view and provide well separated left and right images, the mirror 17 needs to be disposed in very close proximity to the rear aperture of objective lens 11, as shown in FIG. 1. If the lens 11 and the V-shaped mirror 17 are too close, however, some of the reflected light from mirror 17 will be blocked from the eyepiece mirrors 18 and 19 by the lens 11. Thus the lens 11 and mirror 17 should be as close as possible to the rear aperture of the objective without causing loss of field by the lens itself.

While it is practical in the case of low-power microscopes to locate the mirror 17 in close proximity to the rear aperture of the objective lens, it is impractical, if not impossible, in the case of high-power microscopes where the objective lenses are very small and typically mounted so as to make their rear apertures physically inaccessible. High-power microscopes typically include a turret mount having a plurality of lens receiving stations where lenses of various magnifications can be attached so that during examination of an object several different levels of magnification are readily selectable. To accommodate this arrangement, objective lenses for high-power microscopes are typically imbedded within a lens holder designed to be compatible with the turret mount for easy attachment to and detachment therefrom. In these circumstances, the rear aperture of the objective lenses are even less accessible and it is, thus, impossible to dispose a mirror (such as V-shaped mirror 17) at sufficiently close proximity to the rear aperture to realize the full advantages of the present invention.

Figure 2:
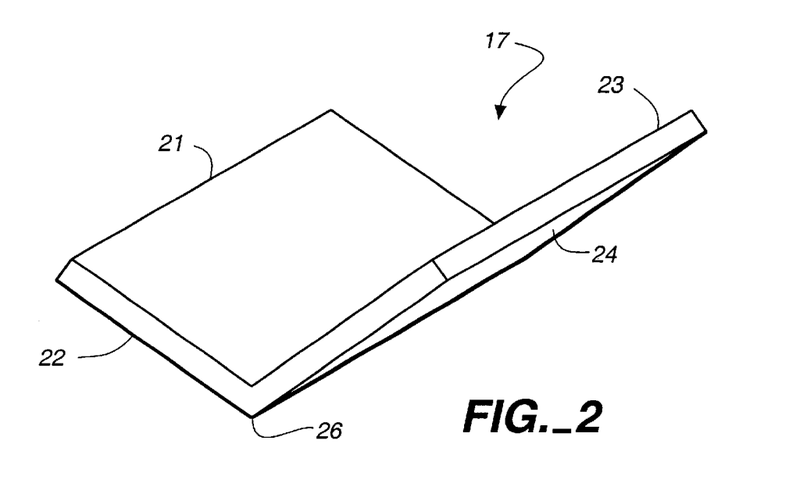
FIG. 2 is an isometric view of the beam-dividing mirror of FIG. 1.
Figure 3:
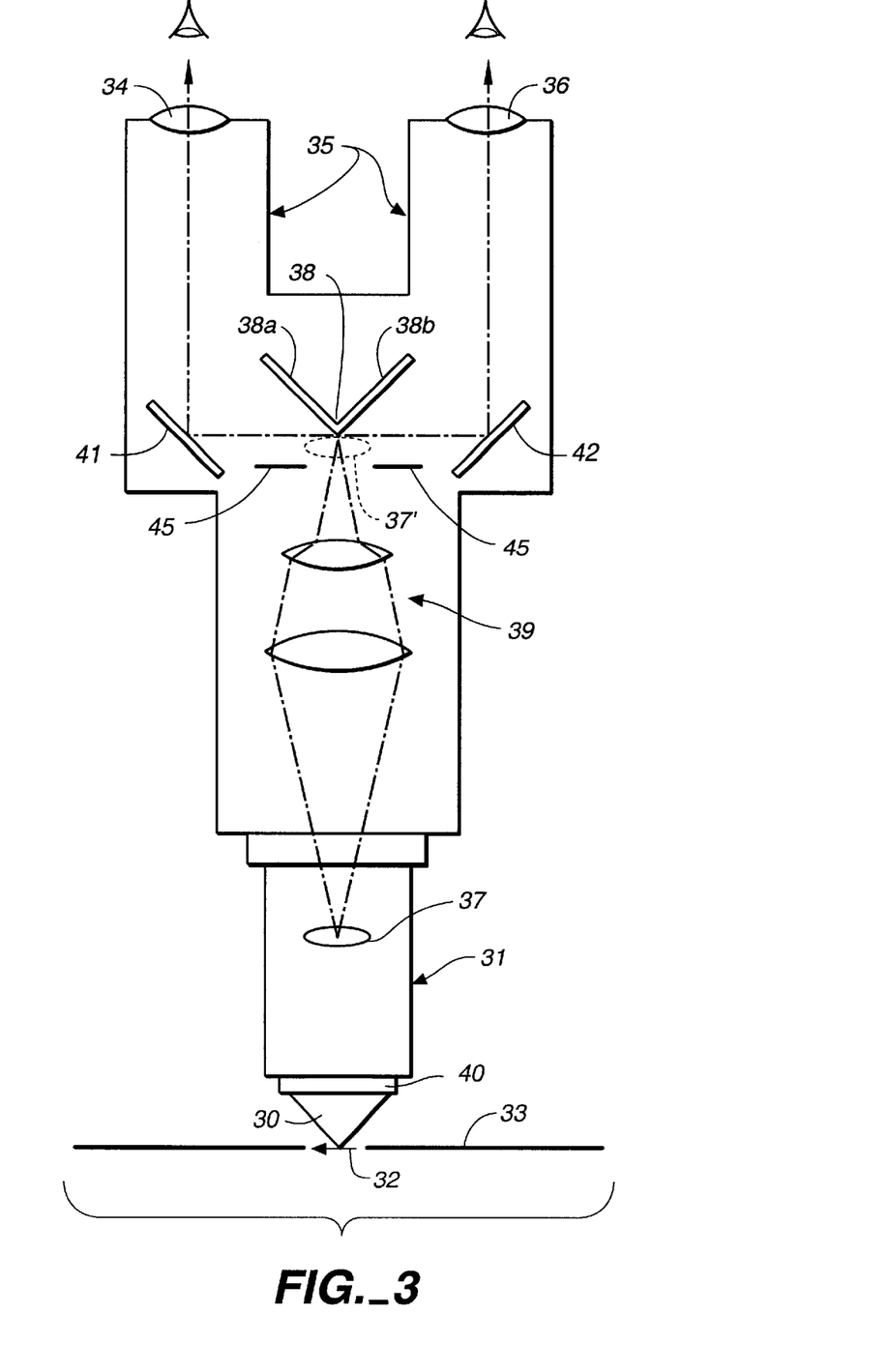
FIG. 3 is a schematic drawing of a binocular optical system for stereoscopic viewing incorporating another embodiment of the present invention in which the rear aperture of the objective lens is imaged in space.

Referring to FIG. 3, an illuminated object 32 (at a specimen plane 33) transmits light 30 to the front element 40 of an objective lens 31. This light is ultimately directed to a left eyepiece 34 and a right eyepiece 36 of a binocular viewing system 35 as described above in connection with the embodiment of FIG. 1. Because the rear aperture 37 of objective lens 31 is physically inaccessible, a V-shaped mirror 38 having reflective surfaces 38a and 38b with the same characteristics as described in connection with mirror 17 reflective surfaces 22 and 24 (FIGS. 1 and 2), for dividing the light from the objective into left and right components is of necessity disposed at a location remote from the rear aperture 37.

In order for mirror 38 to effectively divide the light into left and right components, an image 37' of the rear aperture 37 is projected to a location at or very near mirror 38 by a set of relay lenses (indicated generally at) 39. By imaging the rear aperture 37 to a remote location and locating mirror 38 in close proximity thereto, the division of the light from the rear aperture 37 of the objective lens 31 is accomplished with the same effect as if the mirror 38 were in fact located immediately adjacent the rear aperture 37 itself (as described above in connection with the embodiment of FIGS. 1 and 2). Thus, the mirror 38 directs half of the light from the rear aperture 37 of the objective lens 31 to the left eyepiece 34 by way of left eyepiece mirror 41, and the other half to the right eyepiece 36 by way of right eyepiece mirror 42. When the V-shaped mirror is placed at the projected image of the objective rear aperture (rather than at the rear aperture itself as in the embodiment of FIG. 1), there is no lens element in such close proximity as to occlude any of the reflected light and thus the V-shaped mirror can be placed virtually at the rear aperture.

The best results are achieved by placing the V-shaped mirror 38 as near to the image 37' as possible. As the distance between the mirror 17 and the rear aperture 27 (FIG. 1) or mirror 38 and the image 37' of the rear aperture 37 (FIG. 3) increases, the parallax decreases until at some distance the two mirrors of the V-shaped mirror 38 see the same image (from the same angle) and the stereoscopic effect is lost (and a portion of the field of view is lost). Thus, in the present invention, the dividing V-shaped mirror (17 in FIG. 1 and 38 in FIG. 3) must be within that range of the objective rear aperture or its projected image that produces different images at the two reflective surfaces (22 and 24 of FIG. 1 and 38a and 38b of FIG. 3) of the dividing mirror and thereby produces a stereoscopic effect.

While the beam dividing and directing means described above has been shown as a V-shaped mirror, one or more prisms could also be used for that purpose.

The embodiment of the present invention wherein an image of the rear aperture is projected to a remote location (FIG. 3), permits an iris 45 to be located near the image 37' of the rear aperture 37 of the objective in order to control flare and scattering of light and to improve contrast and depth of field as well. The advantages accruing to locating the iris out of the specimen illumination path (where it is found in the prior art) are described in detail below in connection with FIG. 9.

The various arrangements and specifications of lenses 39 used to create an image 37' of the rear aperture 37 of the objective lens 31 at a remote location in space (where the mirror 38 and iris 45 can be physically disposed in close proximity thereto), are well known to those skilled in the art of microscope optics and as such do not themselves form a part of the invention. For a given objective lens the arrangements are numerous and the optical design can vary considerably.

High power light microscopes popularly in use at the present time employ one of two types of objective lens. One type of lens, produces a beam that is focused at infinity (basically parallel) to permit the distance between the eyepieces and the objective to be varied when necessary to accommodate other equipment. The other type of lens produces a beam which is focused at a finite distance, thereby fixing the distance between the objective lens and the eyepieces of the binocular viewing system. It might appear, in the case of the infinity focus lens, that it would be possible to place a mirror, such as mirror 38, at a remote location from the rear aperture of the objective lens and still obtain a full field of view. In practice, however, although the beam from the objective is focused at infinity, the beam envelope diverges. Thus, at a distance from the objective lens where a mirror such as mirror 38 could be located, the divergence of the beam would cause a significant part of the field of view to be lost and the parallax between right and left images would be greatly reduced. Thus, whether a microscope is one employing a finite focus objective lens or an infinity focus objective lens, it is necessary to create a remote image of the rear aperture of the objective lens adjacent to the dividing mirror 38. It may be necessary to interpose between the rear aperture 37 and the lenses 39 optics, such as a roof prism, for reversing the image so that the image that is viewed at the binocular eyepieces has the same orientation in space as the object being examined.

Figure 4:
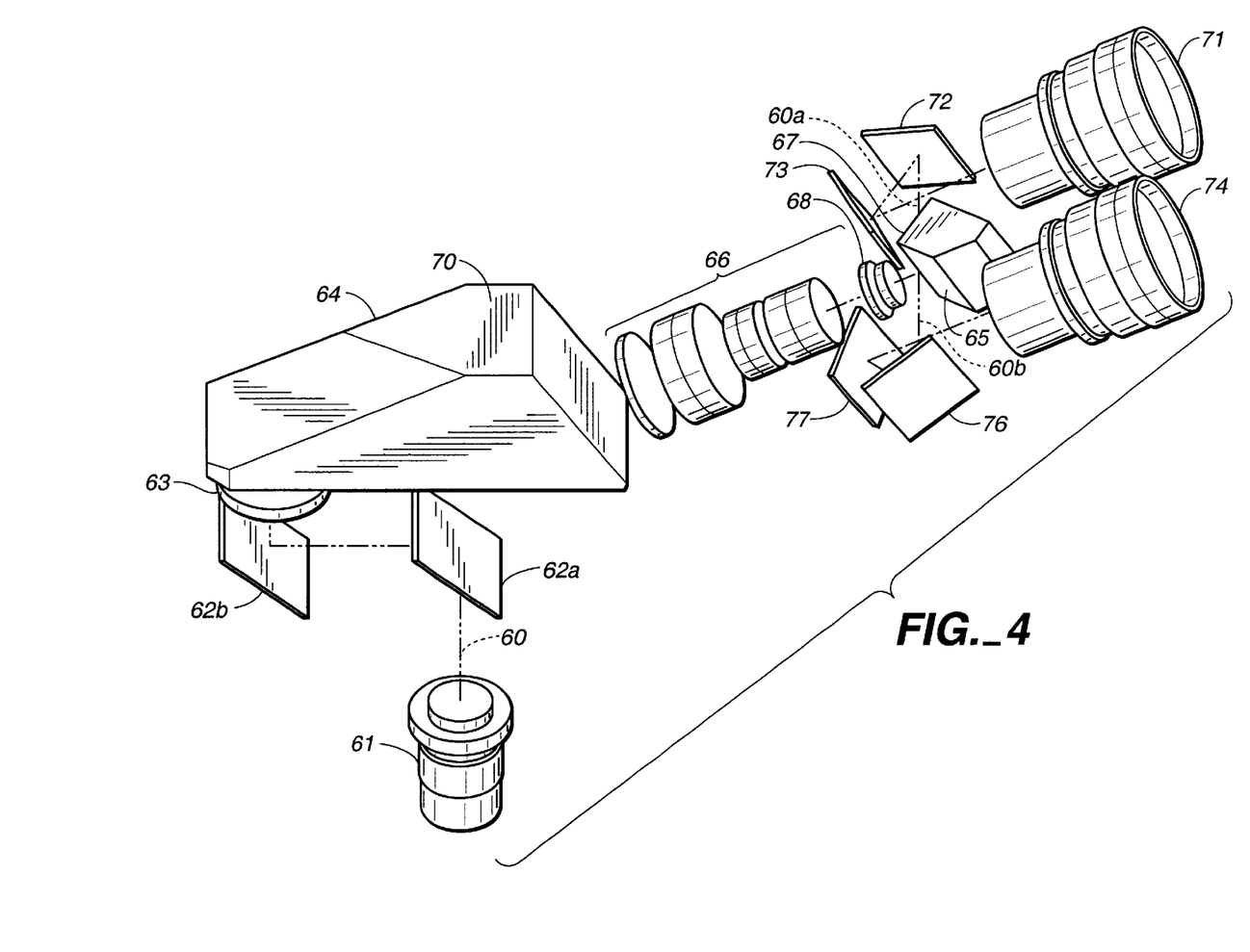
FIG. 4 is a perspective view of an embodiment of the invention including image spacial orientation optics.

Referring to FIG. 4, light beam 60 passing through an objective lens 61 is folded by mirrors 62a and 62b (to reduce the size of the head) and directed through a field lens 63 to a roof prism 64 which established the correct background-foreground orientation to the viewer by directing the left eye view to the left eyepiece 74 and the right eye view to the right eyepiece 71. A deviation prism 70 (which can be separate from or integral with roof prism 64—in this embodiment it is shown integral with the roof prism 64) orients the axis of the light beam 60 at an angle comfortable to a viewer. The light beam 60 then passes through a series of lenses 66 that act as a relay system to image the rear aperture of the objective lens 61 in close proximity to the edge of V-shaped planes 65 (only one of which is shown) of a polyhedron dividing mirror 67. An iris 68 is disposed in the light path between the lenses 66 and the mirror 67 in order to reduce flare.

A first separate beam 60a of the divided beam is reflected into an eyepiece 71 by beam reflector mirrors 72 and 73 (72 may be partially silvered to permit transmission as well as reflection), while the other part 60b of the beam is reflected into eyepiece 74 by beam reflectors 76 and 77 (76 may be partially silvered mirrors to permit transmission as well as reflection). The use of a two mirror reflectors to reflect the beam into an eyepiece as opposed to a single mirror (as in the embodiments of FIGS. 1 and 3) adds an additional reflection which reverses the image giving it correct left-right orientation to the viewer.

The roof prism 64 operates on the beam not only to bend it to a more user friendly angle but also to orient the image so that the background-foreground orientation is the same to the observer as the actual specimen being observed. However, in doing so, prism 64 also reverses the left-right orientation of the specimen thus requiring mirrors 72 and 76.

Other arrangements of mirrors and prisms, some well known in the art, can be employed in the system of the present invention to orient the image to the observer to correspond to the orientation of the specimen relative to the observer In addition to an observer viewing the stereoscopic image through eyepieces, the present invention affords the ability to create high power simultaneous stereo pair photographs.

Figure 5:
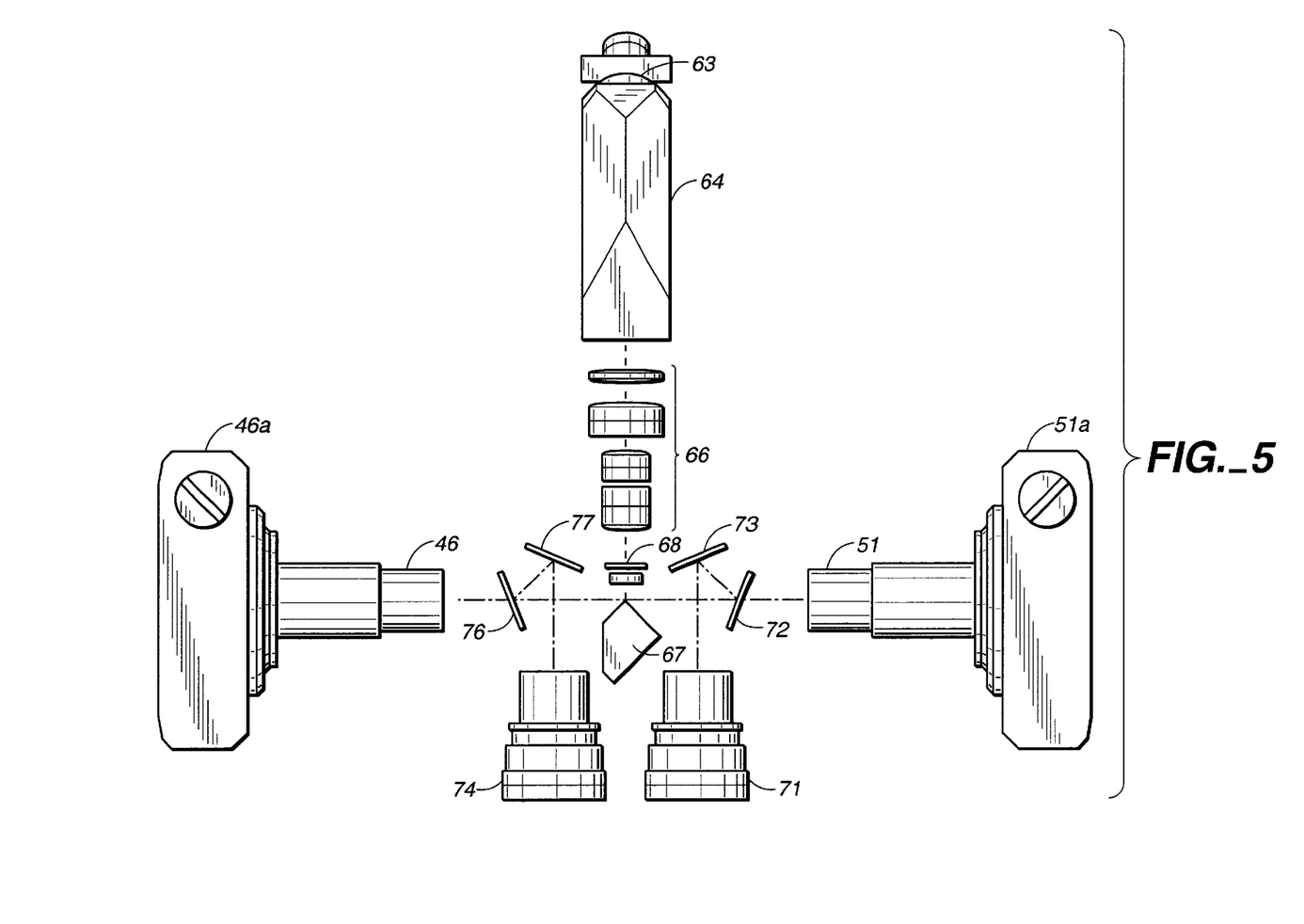
FIG. 5 is an overhead view of the embodiment of FIG. 4 showing the head of the present invention with cameras positioned to receive part of the image beams.
Figure 6:
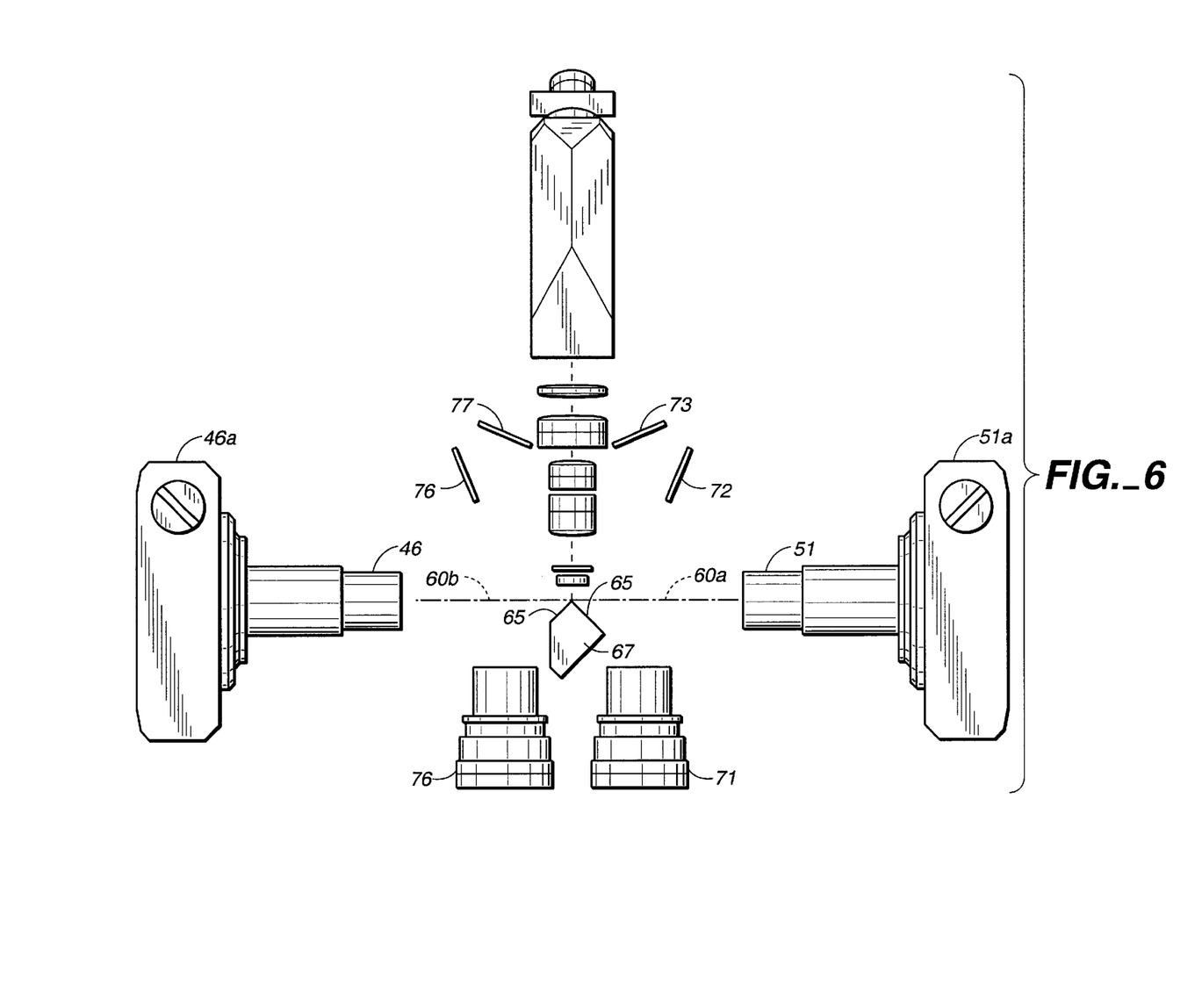
FIG. 6 is the same as FIG. 5 with the polyhedron reflector rotated to a second position and the eyepiece reflecting mirrors positioned out of the beams' paths.
Figure 7:
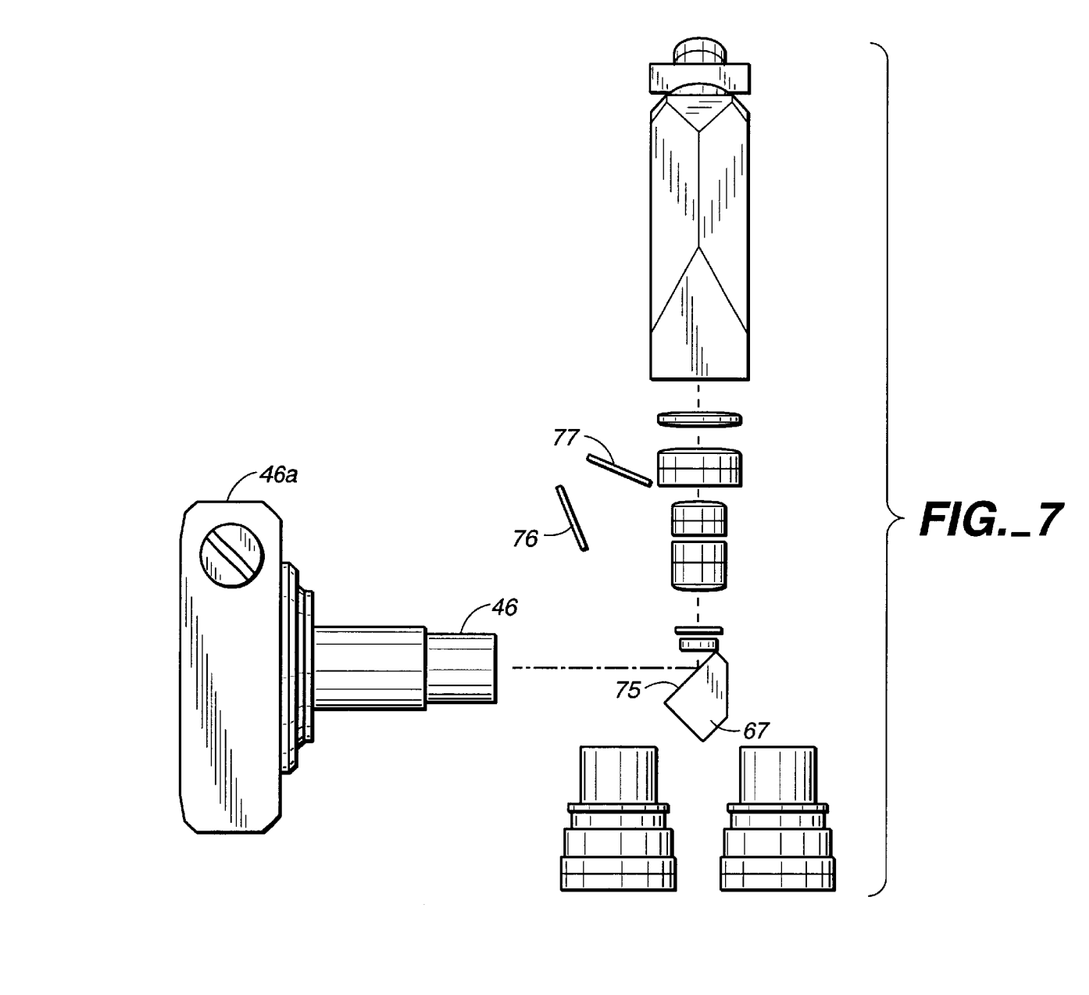
FIG. 7 is the same as FIG. 6 with the polyhedron reflector rotated to a new position wherein all of the beam is reflected into one camera.

Referring to FIGS. 5, 6, and 7, a first photographic camera port 46 is located in the path of the light beam that passes through the partially silvered mirror 76, while a second photographic camera port 51 is located in the path of the light beam that passes through the partially silvered mirror 72. Photographic cameras 46a and 51a are attached to the camera ports 46 and 51, respectively.

When it is not necessary to provide an image of the object to the eye-pieces, the mirrors 72, 73, 76, and 77 can be selectively positioned out of the paths of the beam 60a and 60b (see FIG. 6) to permit the reflecting surfaces 65 of the polyhedron dividing mirror 67 to reflect beams directly into the cameras ports 46 and 51 so as to increase the light available to the cameras 46a and 51a.

Because the present invention permits stereo photos to be taken of the right image and the left image simultaneously, the present invention provides, for the first time, a stereoscopic microscope viewing system capable of taking high power stereo pair photographs of objects (such as living organisms) whose images are in constant flux.

For two-dimensional, high resolution photography using a single camera, the present invention provides the polyhedron dividing mirror 67 with an integral 45 degree reflective surface deflector 75 which when rotated into the path of the light beam 60 (see FIG. 7) directs the light beam 60 directly into camera 46a. The mirrors 76 and 72 remain out of the beam path.

Figure 8:
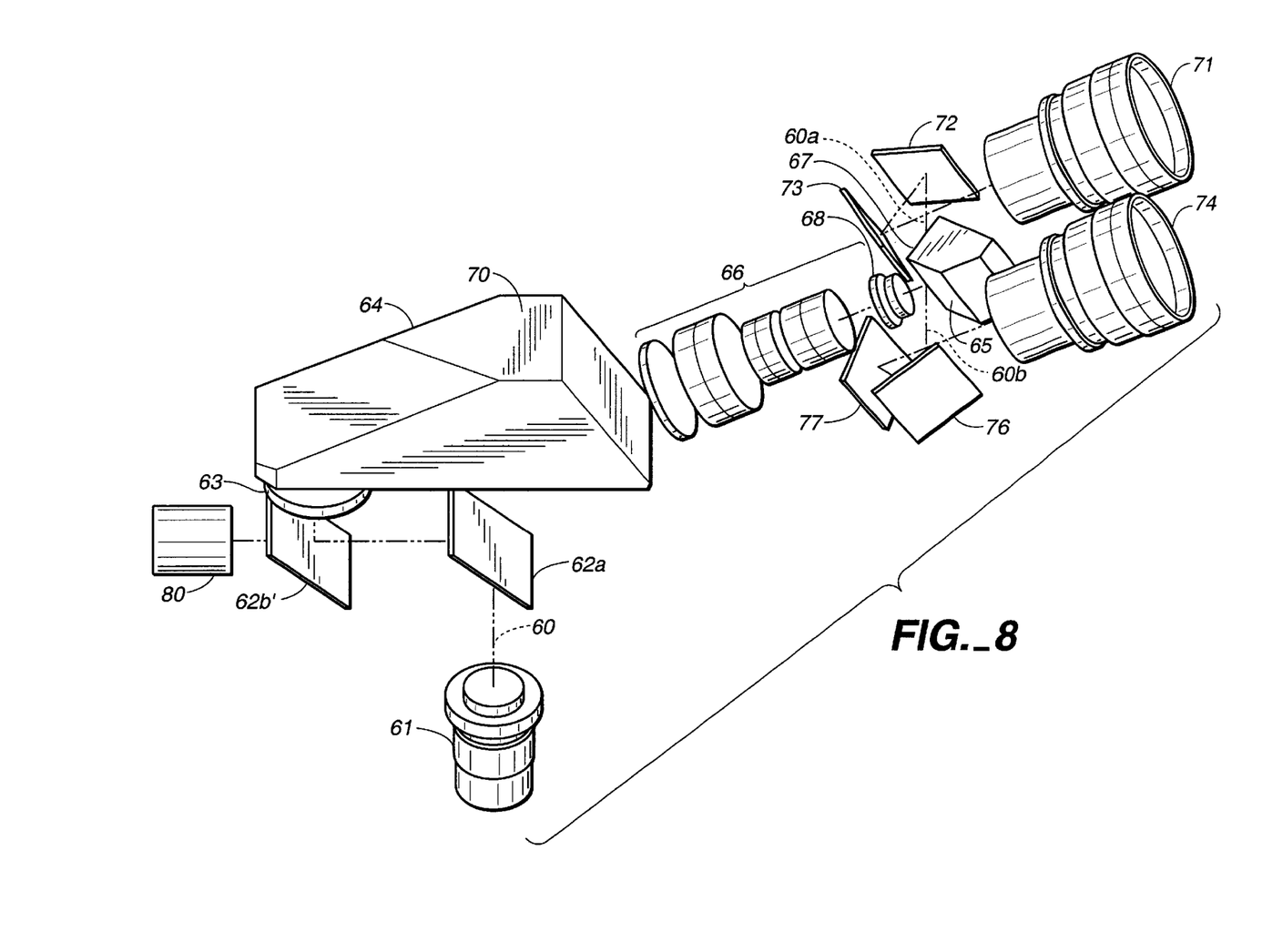
FIG. 8 is an alternative embodiment to that shown in FIG. 4 with the addition of means for two dimensional photo recording through a minimum of glass.

Referring to FIG. 8, an alternative embodiment of the invention provides a mirror 62b' which is partially silvered (e.g. 80/20) to permit most of the light (80% for example) to pass directly through to a camera port 80 with the rest of the light (20%) reflecting from mirror 62b' and then passing through to the viewing eyepieces 71 and 74 as previously described with reference to FIG. 4. The advantage of this embodiment is that the light beam 60 enters the camera port 80 directly and before it passed through the multiple lens and prism system necessary to produce correctly spatially oriented stereo images to a viewer. The port 80 thus sees an image whose quality is undiminished. Where viewing of the image is no longer necessary, the mirror 62b' can be selectively positioned out of the path of light beam 60 to permit the entire beam 60 to enter the camera port 80.

Thus, the present invention teaches a system whereby an object can be viewed under high power magnification in 3D with high resolution and simultaneous 3D stereo pair photos can be taken either while still viewing the object or after the viewing means has been disabled to enable all of the available light to be directed to the photography recording apparatus. Two dimensional high power high resolution photographs can also be taken while viewing the object in 3D.

Figure 9:
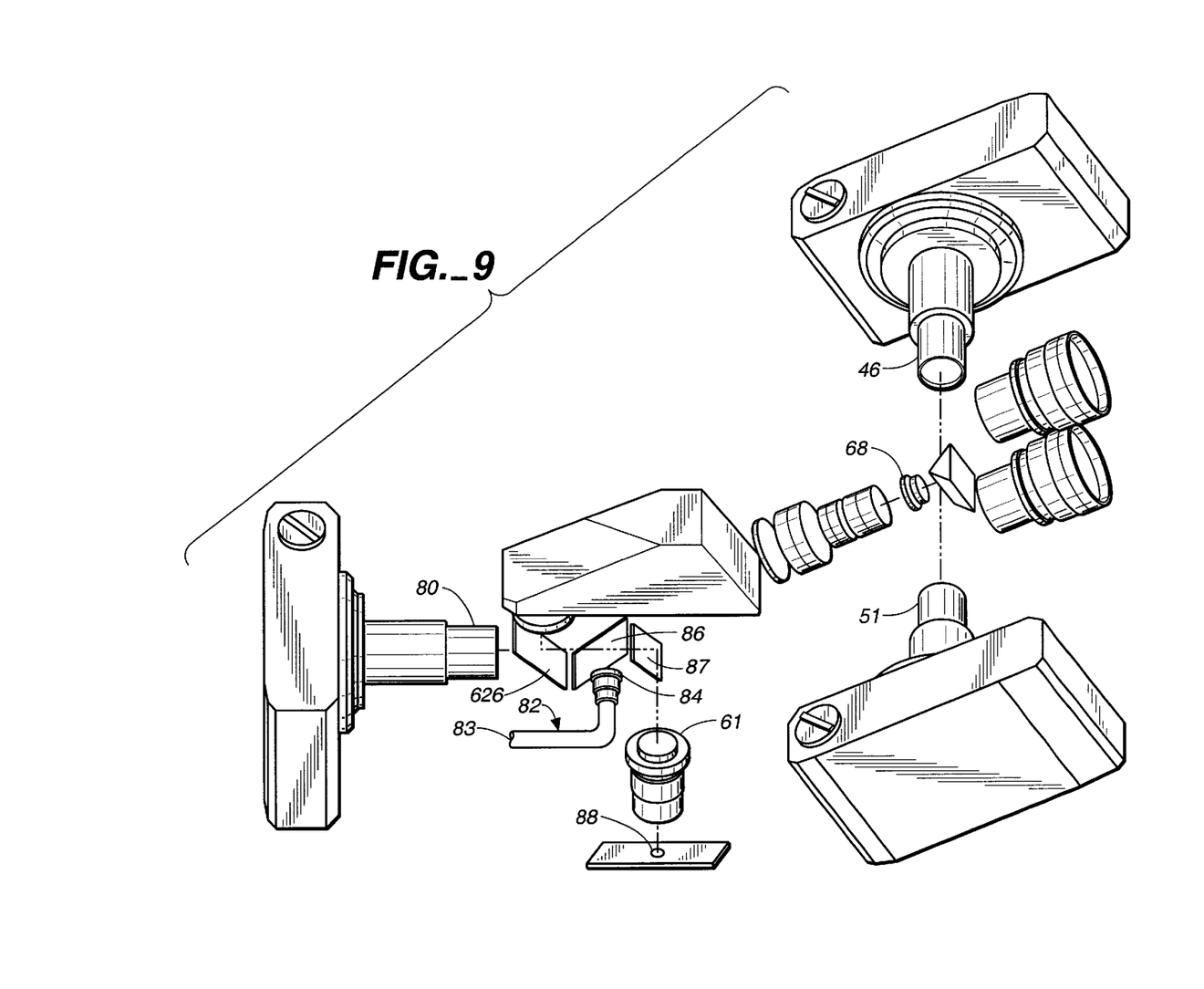
FIG. 9 is a perspective view of an embodiment of the invention including epi illumination and flare control.

Referring to FIG. 9, a reflection light source 82 (shown by way of example only as an epi illumination light source 82 including a fiber optic bundle 83 with a lens 84 for focusing purposes—other known forms of reflected light, including side lighting, can be used as well). The light from source 82 is directed onto, and reflected by, a beam splitter (such as a half silvered mirror) 86 and a mirror 87 and then through the objective 61 to a specimen 88. The light reflected by the specimen passes through the objective 61 onto the mirror 87 and through the half silvered mirror 86 to mirror 62b and into the optical system described with reference to the other Figures. The benefits to a reflection illumination microscope of the combination of the projected image of the rear aperture of the objective lens and an iris in close proximity to that projected image are enjoyed by two dimensional viewing systems as well as by the 3D system of the present invention. Since the light from the source 82 is not constricted by an iris as it passes to and from the specimen 88, essentially all of the available illumination from the light source 82 reaches and illuminates the specimen 88 and the full numerical aperture of illumination is operative.

The iris 68, previously described, is optically disposed near the projected image 37' (see FIGS. 3 and 8) of the rear aperture of the objective in a portion of the reflection path of the beam 60 which is not coincident with any part of the illumination path of the beam 60 from the light source to the specimen. In order to avoid a reduction in the field of view and maintain uniform lighting over the entire field of view, the iris is preferably within that near proximity of the projected image of the rear aperture where the iris is not seen by the viewing means (human observer, camera, etc.) The iris, so located, has the same effect as an iris within the rear aperture of the objective; it limits the flare before the image carrying beam 60 reaches either the eyepieces 71 and 74 or the camera ports 46 and 51. Because the iris of the present invention is not in the illumination path, however, it does not restrict the light from the light source 82 to the specimen 88. In this way flare is effectively controlled without reducing the light available to light a specimen, including the illusive specimens that the advent of fluorescent illumination has made possible to record and see.

Obviously, many modifications and variations of the present invention are possible in light of the above teachings. It is, therefore, to be understood that within the scope of the appended claims the invention may be practiced otherwise than as specifically described.

What is claimed is:

1. A stereo pair component for a light microscope which microscope is characterized by a single objective lens with a rear aperture through which light beams pass and which rear aperture is projected by optical relay lenses to an aperture plane remote from the objective lens, the combination comprising:

a beam divider disposed in close proximity to the projected image of the rear aperture of the objective lens and in the path of a light beam passing through the objective lens, said beam divider operative to divide the beam into first and second separate beams wherein said first separate beam includes light passing from one area of the objective lens rear aperture and said second separate beam includes light passing from a different area of the rear aperture of the objective lens;

a first camera port disposed in the path of said first separate beam;

a second camera port disposed in the path of said second separate beam; and a variable diaphragm iris disposed in close proximity to the projected image of the rear aperture Of the objective lens and in the path of a light beam passing through the objective lens and between the objective lens and said beam dividing means.

2. The stereo pair component of claim 1 further comprising;

a beam deflector selectably positionable into the path of a light beam from the objective lens between the objective lens and said beam divider and operative to deflect the light beam into only one of said camera ports.

3. The stereo pair component of claim 2 wherein said beam divider is a V-shaped mirror and said beam deflector is a flat mirror integrally connected to said V-shaped mirror.

4. A stereo pair component for a light microscope which microscope is characterized by a single objective lens with a rear aperture through which light beams pass and which rear aperture is projected by optical relay lenses to an aperture plane remote from the objective lens, the combination comprising:

a beam divider disposed in close proximity to the projected image of the rear aperture of the objective lens and in the path of a light beam passing through the objective lens, said beam divider operative to divide the beam into first and second separate beams wherein said first separate beam includes light passing from one area of the objective lens rear aperture and said second separate beam includes light passing from a different area of the rear aperture of the objective lens;

a first camera port disposed in the path of said first separate beam;

a second camera port disposed in the path of said second separate beam; and a beam deflector selectably positionable into the path of a light beam from the objective lens between the objective lens and said beam divider and operative to deflect the light beam into only one of said camera ports.

5. In a high power light microscope having a single objective lens with a rear aperture through which light from an object to be viewed passes, and dual eyepiece viewing apparatus for viewing an image of the object, the improvement comprising:

a beam divider optically disposed between the objective lens and the dual eyepiece viewing apparatus in the path of the light from the object to be viewed and operative to divide the light from the object to be viewed into first and second separate light beams wherein the first separate light beam includes light passing from one area of the objective lens rear aperture to one of the dual eyepieces of the viewing apparatus and the second separate light beam includes light passing from a different area of the objective lens rear aperture to the other of the dual eyepieces of the viewing apparatus, wherein said beam divider is located remote from the rear aperture of the objective lens;

a projecting lens system disposed between the objective lens and said beam divider in the path of the light from the object to be viewed operative to image the rear aperture of the objective lens at a location remote from the objective lens and in close proximity to said beam divider;

a first camera port;

a second camera port;

a first reflector disposed in the path of the first separate beam and simultaneously directing a portion of the first separate beam to the first camera port and a portion of the first separate beam to one of the eyepieces; and a second reflector disposed in the path of the second separate beam simultaneously directing a portion of the second separate beam to the second camera port and a portion of the second separate beam to one of the eyepieces, whereby a viewer can view an object in 3-D while taking both photographs of a stereo pair photograph simultaneously; and a beam deflector selectable positionable into the path of the light beam from the object to be viewed before it is divided by said beam divider and operative to deflect the light from the object to be viewed into only one of said camera ports.

6. The microscope of claim 5 further comprising:

a variable iris diaphragm for controlling flare optically disposed in close proximity to the projected image of the rear aperture of the objective lens between the objective lens and said beam divider.

7. The microscope of claim 6 wherein said beam divider is a V-shaped mirror and said beam deflector is a flat mirror integrally connected to said V-shaped mirror.

8. The microscope of claim 7 wherein both said first and second reflectors are selectively moveable out of the paths of the first and second separate beams, respectively, allowing all of the beams to enter their respective camera ports.

9. The microscope of claim 5 wherein said beam divider is within the range of the projected image of the rear aperture of the objective lens which produces a stereoscopic effect.

10. The microscope of claim 9 further comprising:

a reflection illuminator providing an illumination light beam through the objective lens onto the object for reflection therefrom, and;

an iris disposed in a portion of the light path from the object to said beam divider that is not between said reflection illuminator and the object.

11. The microscope of claim 6 further comprising:

a beam deflector selectably positionable into the path of the light from the object to be viewed before it is divided by said beam divider and operative to deflect the light from the object to be viewed into only one of said camera ports.

12. The microscope of claim 11 wherein said beam divider is a V-shaped mirror and said beam deflector is a flat mirror integrally connected to said V-shaped mirror.

13. The microscope of claim 12 wherein both said first and second reflectors are selectively moveable out of the paths of the first and second separate beams, respectively, allowing all of the beams to enter their respective camera ports.

14. The microscope of claim 6 further comprising:

a reflection illuminator providing an illumination light beam through the objective lens onto the object for reflection therefrom, and wherein said iris is disposed in a portion of the light path from the object to said beam divider that is not between said reflection illuminator and the object.

15. The stereo pair component of claim 4 wherein said beam divider is a V-shaped mirror and said beam deflector is a flat mirror integrally connected to said V-shaped mirror.

* * * * *